United States Patent
Lee et al.

(10) Patent No.: US 9,502,966 B2
(45) Date of Patent: Nov. 22, 2016

(54) PUMPING CIRCUIT

(71) Applicant: SK hynix Inc., Icheon-si, Gyeonggi-do (KR)

(72) Inventors: Myung Hwan Lee, Cheonan-si (KR); Yun Seok Hong, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 108 days.

(21) Appl. No.: 14/078,666

(22) Filed: Nov. 13, 2013

(65) Prior Publication Data

US 2014/0369095 A1 Dec. 18, 2014

(30) Foreign Application Priority Data

Jun. 17, 2013 (KR) .................. 10-2013-0068921

(51) Int. Cl.
*H02M 3/18* (2006.01)
*H02M 3/07* (2006.01)

(52) U.S. Cl.
CPC ...................... *H02M 3/07* (2013.01)

(58) Field of Classification Search
CPC .......... H02M 2003/071; H02M 2003/072; H02M 2003/075–2003/078; H02M 3/07; H02M 3/073; H02M 2001/0029
USPC ........... 327/534, 148, 157, 536; 363/59, 60
See application file for complete search history.

(56) References Cited

U.S. PATENT DOCUMENTS

| | | | |
|---|---|---|---|
| 5,729,172 A * | 3/1998 | Tsukada | 327/536 |
| 5,808,505 A | 9/1998 | Tsukada | |
| 5,889,664 A * | 3/1999 | Oh | 363/60 |
| 6,072,357 A * | 6/2000 | Jo | 327/536 |
| 6,259,612 B1 * | 7/2001 | Itoh | 363/60 |
| 2005/0168265 A1 | 8/2005 | Lee et al. | |
| 2009/0091366 A1 | 4/2009 | Baek et al. | |
| 2009/0184740 A1 * | 7/2009 | Salleh | H03L 7/093 327/157 |
| 2010/0134163 A1 * | 6/2010 | Kawamoto | H03L 7/18 327/157 |
| 2014/0268936 A1 * | 9/2014 | Lu et al. | 363/49 |

FOREIGN PATENT DOCUMENTS

| | | |
|---|---|---|
| KR | 1019990061014 A | 7/1999 |
| KR | 1020050079179 A | 8/2005 |
| KR | 1020070002804 A | 1/2007 |
| KR | 1020090036453 A | 4/2009 |

OTHER PUBLICATIONS

Neaman. "Microelectronics Circuit Analysis and Design". 3rd Edition. McGraw-Hill Publishers. 2007. pp. 137-138.*

* cited by examiner

*Primary Examiner* — Gary L Laxton
*Assistant Examiner* — Kevin H Sprenger
(74) *Attorney, Agent, or Firm* — William Park & Associates Ltd.

(57) ABSTRACT

A pumping circuit includes a charge pump configured to generate a pumping voltage based on a first voltage in response to an oscillation signal, and an oscillator configured to provide a period-controlled oscillation signal based on the first voltage and a second voltage.

12 Claims, 3 Drawing Sheets

PUMPING CIRCUIT

CROSS-REFERENCES TO RELATED APPLICATION

The present application claims priority to Korean patent application number 10-2013-0068921, filed on Jun. 17, 2013, in the Korean Intellectual Property Office, which is incorporated herein by reference in its entirety as set forth in full.

BACKGROUND OF THE INVENTION

1. Technical Field

The inventive concept relates to a pumping circuit, and more particularly, to a pumping circuit including an oscillator which generates an oscillation signal based on an external power voltage.

2. Related Art

Pumping circuits are a kind of a power supply circuit configured to boost and provide a voltage in case of power loss during an operation of an electronic apparatus. Pumping circuits are circuits required to compensate power which is reduced due to various factors. However, pumping circuits sometimes do not operate in an ideal environment, a pumping voltage generated by the pumping circuit is also affected by various factors.

SUMMARY

One or more example embodiments are provided to a pumping circuit which generates an oscillation signal changed according to an external voltage and outputs a pumping voltage that is kept constant.

One or more example embodiments are provided to a pumping circuit which controls noise by keeping a pumping voltage constant regardless of change in an external power voltage.

According to an aspect of an example embodiment, there is a pumping circuit. The pumping circuit may include: a charge pump configured to generate a pumping voltage based on a first voltage in response to an oscillation signal; and an oscillator configured to provide a period-controlled oscillation signal based on the first voltage and a second voltage.

In an embodiment, the oscillator may include a plurality of inverter units sequentially connected in a ring or chain form. The plurality of inverter units may receive the first voltage as a bias voltage and control a period of the oscillation signal. For example, each of the plurality of inverter units may include a PMOS transistor and an NMOS transistor which are electrically coupled in series between the second voltage and a ground voltage, and of which a gate terminal of at least one inverter unit is coupled with a gate of another inverter unit. The PMOS transistor may receive the first voltage as a bulk bias voltage.

In an embodiment, the first voltage may correspond to an external power voltage, and the second voltage may correspond to an internal power voltage.

In an embodiment, the pumping circuit may further include a logical operator configured to perform a logical AND operation on the oscillation signal corresponding to an output signal of a last inverter unit among the plurality of inverter units, and an oscillation enable signal. An output signal of the logical operator may be provided as an input signal to a first inverter unit among a plurality of inverter units.

In an embodiment, each of the plurality of inverter units may further include a low-pass filter configured to remove noise of the oscillation signal. For example, the low-pass filter may include a resistance component and a capacitance component.

In an embodiment, the pumping circuit may further include a voltage provider configured to selectively provide the first voltage or the second voltage to the oscillator. The voltage provider may selectively provide the first voltage or the second voltage to each of the plurality of inverter units comprising the oscillator as a bulk bias voltage.

For example, the voltage provider may selectively provide the first voltage or the second voltage based on the pumping voltage and the oscillation signal.

In an embodiment, a period of the oscillation signal may be controlled to be proportional to change in the first voltage.

These and other features, aspects, and embodiments are described below in the section entitled "DETAILED DESCRIPTION".

BRIEF DESCRIPTION OF THE DRAWINGS

The above and other aspects, features and other advantages of the subject matter of the present disclosure will be more clearly understood from the following detailed description taken in conjunction with the accompanying drawings, in which.

DETAILED DESCRIPTION

Figure 1:
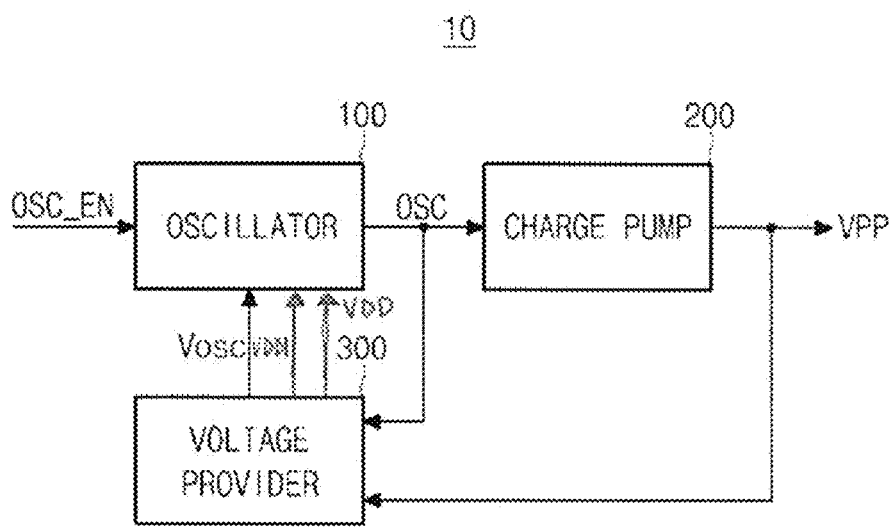
FIG. 1 is a block diagram illustrating a pumping circuit according to an example embodiment of the present invention.

Hereinafter, example embodiments will be described in greater detail with reference to the accompanying drawings.

Example embodiments are described herein with reference to cross-sectional illustrations that are schematic illustrations of example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements. It is also understood that when a layer is referred to as being "on" another layer or substrate, it can be directly on the other layer or substrate, or intervening layers may also be present.

FIG. 1 is a block diagram illustrating a pumping circuit according to an example embodiment of the present invention.

Referring to FIG. 1, a pumping circuit 10 according to an example embodiment of the present invention includes an oscillator 100 and a charge pump 200. In some embodiments, the pumping circuit 10 may further include a voltage provider 300.

The oscillator 100 generates an oscillation signal OSC in response to an oscillation enable signal OSC_EN. The oscillator 100 provides the oscillation signal OSC to the charge pump 200. The oscillator 100 may operate selectively based on an external power voltage VDD as well as operate based on an internal power voltage VDDI of the pumping circuit 10. When the oscillator 100 operates based on only the internal power voltage VDDI, the oscillation signal OSC may be generated with a constant period.

However, as described later, since the charge pump 200 which operates in response to the oscillation signal OSC operates based on the external power voltage VDD, when the external power voltage VDD is changed according to a specific factor, a pumping voltage VPP also changes. If the oscillation signal is kept constant while the pumping voltage VPP changes, the pumping voltage VPP changes exponentially while driving performance or driving speed of the charge pump 200 and the oscillation signal OSC is kept constant. It is difficult to control change in the pumping voltage VPP in accordance with the external power voltage VDD.

Therefore, it may be necessary to keep the pumping voltage VPP constant by increasing the period of the oscillation signal OSC as the pumping voltage VPP increases, and reducing the period of the oscillation signal OSC as the pumping voltage VPP reduces.

The charge pump 200 generates the pumping voltage VPP in response to the oscillation signal OSC. The pumping voltage VPP may be generated when a voltage higher than the external power voltage VDD is required in a certain apparatus. Further, a magnitude of the pumping voltage VPP may be adjusted in accordance with a preset magnitude. For example, the pumping voltage VPP may have a voltage magnitude twice as large as the external power voltage VDD.

The pumping circuit 10 according to an example embodiment of the present invention does not generate the oscillation signal OSC based only on the internal power voltage VDDI, but operates based on the internal power voltage VDDI and the external power voltage VDD so that the period of the oscillation signal OSC is controlled according to a change in the external power voltage VDD. In one embodiment, the period of the oscillation signal is controlled to be proportional to change in the external power voltage VDD.

Therefore, the pumping circuit 10 according to an example embodiment of the present invention may be configured to stably generate the pumping voltage VPP having a constant magnitude regardless of changes in the external power voltage VDD.

The voltage provider 300 may selectively provide a voltage to the oscillator 100. Although it will be described later with reference to FIG. 3, when the oscillator 100 generates the oscillation signal OSC based on the internal power voltage VDDI and the external power voltage VDD, the voltage provider 300 selectively provides the internal power voltage VDDI or the external power voltage VDD to the oscillator 100 so as to control the period of the oscillation signal OSC.

The voltage provider 300 may internally detect the pumping voltage VPP and/or the oscillation signal OSC to adjust a voltage provided to the oscillator 100. In embodiments, the voltage provider 300 may be configured to receive a control signal from an external control unit such as a controller to provide different voltages to the oscillator 100.

The voltage provider 300 selectively provides a bulk bias voltage VB to the oscillator 100 to control the period of the oscillation signal OSC. For example, the voltage provider 300 may selectively provide the bulk bias voltage VB to each of the plurality of inverter units (see FIG. 3) based on changes in the pumping voltage VPP and the oscillation signal OSC in accordance with changes in the external power voltage VDD.

For example, the voltage provider selects the bulk bias voltage VB from one of the internal power voltage VDDI or the external power voltage VDD.

For convenience of description, FIG. 1 illustrates a voltage provided from the voltage provider 300 to the oscillator 100 as an oscillation voltage Vosc. In embodiments, the oscillation voltage Vosc may include all voltages provided to the oscillator 100 regardless of the period control of the oscillation signal OSC.

Figure 2A:
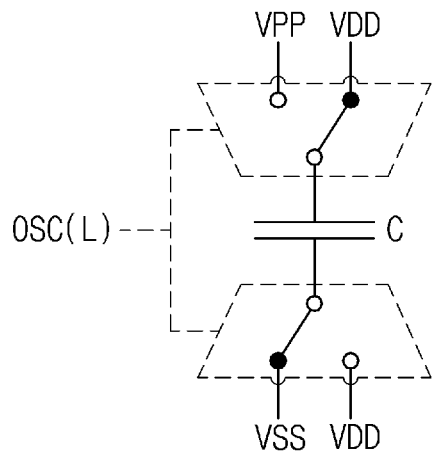
FIGS. 2A and 2B are views conceptually explaining an operation of a charge pump of FIG. 1.
Figure 2B:
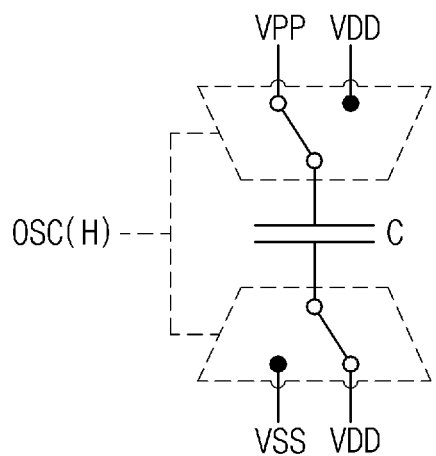

FIGS. 2A and 2B are views used for conceptually explaining an operation of the charge pump of FIG. 1. In response to the oscillation signal OSC, in one example, the charge pump 200 changes a voltage provided to terminals of a capacitor C.

Referring to FIG. 2A, when the oscillation signal OSC is in a first logic state (for example, a logic low (L) state), the capacitor C of the charge pump 200 may be configured to be connected between the external power voltage VDD and a ground voltage VSS.

Referring to FIG. 2B, when the oscillation signal OSC is in a second logic state (for example, a logic high (H) state), the capacitor C of the charge pump 200 may be configured to be connected between the external power voltage VDD and the pumping voltage VPP. Here, the pumping voltage VPP may have, for example, predetermined multiple values of the power voltage VDD. That is, the pumping voltage VPP has a value depending on the external power voltage VDD.

The first logic state and the second logic state may be determined according to a voltage level of the oscillation signal OSC, and may be understood as signals having different phases. The pumping voltage VPP may also be kept constant in a state in which the external power voltage is constant. However, when the external power voltage is changed as described above, the pumping voltage VPP is changed according to the external power voltage VDD.

Figure 3:
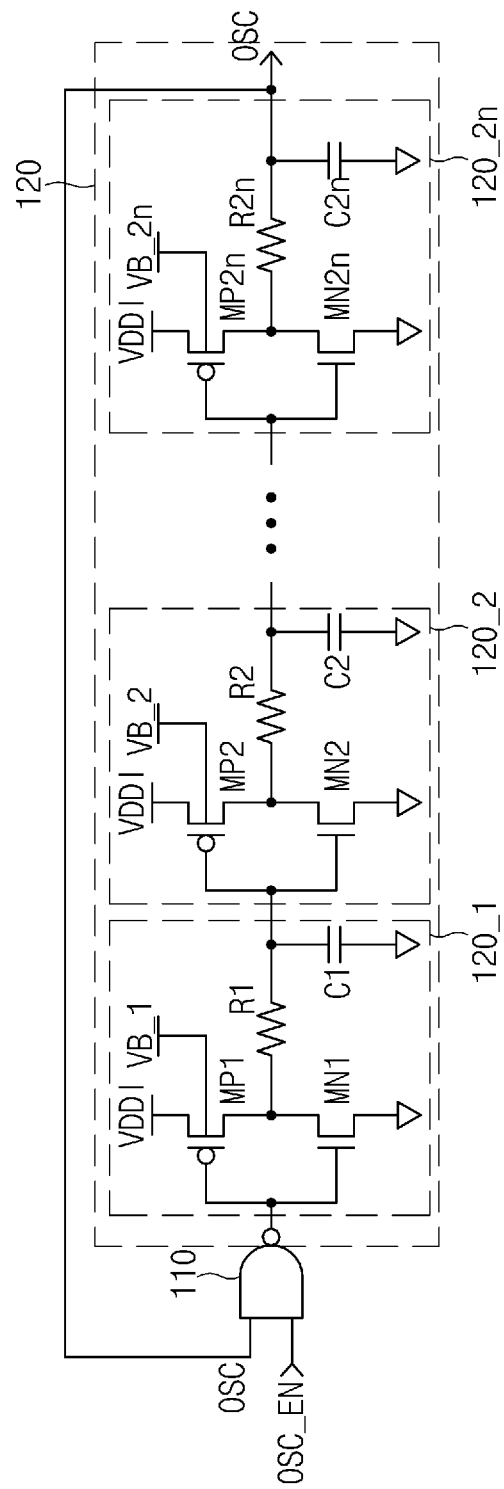
FIG. 3 is a circuit diagram illustrating an embodiment of an oscillator of FIG. 1.

FIG. 3 is a block diagram illustrating an embodiment of the oscillator of FIG. 1.

Referring to FIG. 3, the oscillator 100 may include a logical operator 110 and a plurality of inverter units 120_1, 120_2, . . . , 120_2n. The plurality of inverter units 120_1, 120_2, . . . , 120_2n may be configured as an even number of inverter units sequentially connected in a chain form. An even number of inverter units 120_1, 120_2, . . . , 120_2n are connected so that the oscillation signal OSC may be oscillated through the logical operator 110. The connection of an even number of inverter units, which is depicted in FIG. 3, is used because the logical operator 110 performs an inversion logical operation once. In some embodiments, an odd number of inversion operations is used for oscillation. For example, the oscillator 300 may have a configuration of a ring oscillator. Thus, the inverter units may be connected in a ring or a chain form.

The logical operator 110 performs a logical operation on the oscillation signal OSC and the oscillation enable signal OSC_EN and provides an output signal as an input signal to a first inverter unit 120_1.

In embodiments, the logical operator 110 may be a logical AND operator or a logical NAND operator. When the oscillation enable signal OSC_EN is in a state corresponding to a logic High (H) state, the logical operator 110 inverts the oscillation signal OSC corresponding to an output signal of a 2n-th inverter unit 120_2n and provides an inverted signal to the first inverter unit 120-1.

The number of inverter units may be determined according to a type of a logical operation performed in the logical operator 110 as described above. In embodiments, when the logical operator 110 performs a simple positive logical operation as opposed to an inversion logical operation, an odd number of inverter units may be included in the oscillator 100.

The inverter units 120_1, 120_2, ..., 120_2n have a substantially similar structure. In some embodiments, which an output terminal of an inverter unit in a previous stage is coupled with an input terminal of an inverter unit in a next stage. For example, the output terminal of inverter unit 102_1 may be coupled with the input terminal of inverter unit 120_2. The structure of one of the inverter units, for example, the structure of the first inverter unit 120_1 will be described.

The first inverter unit 120_1 may include a first PMOS transistor MP1 and a first NMOS transistor MN1 which are electrically coupled in series between the internal power voltage VDDI and a ground voltage VSS. The first inverter unit 120_1 may also include an RC stabilization unit R1 and C1 connected with a node between the PMOS transistor MP1 and the NMOS transistor MN1 and the ground voltage VSS.

The first PMOS transistor MP1 and the first NMOS transistor MN1 may perform a complementary operation on the output signal of the logical operator 110 received through gates thereof.

When the output signal of the logical operator 110 corresponds to a logic low (L) state, the first PMOS transistor MP1 is turned on, and the first NMOS transistor MN1 is turned off. Therefore, a node between the first PMOS transistor MP1 and the first NMOS transistor MN1 has a value corresponding to approximately the internal power voltage VDD1. The value corresponds to a logic high (H) state and acts to invert the output signal of the logical operator 110.

However, in an example embodiment of the present invention, a first bias voltage, such as a first bulk bias voltage VB_1 is applied to the first PMOS transistor MP1. The first bulk bias voltage VB_1 may correspond to the external power voltage VDD.

A threshold voltage of the first PMOS transistor MP1 may be changed in accordance with an application of the first bulk-bias voltage VB_1, thus driving performance of the first PMOS transistor MP1 is also changed. For example, when the first bulk bias voltage VB_1 is increased, the threshold voltage of the first PMOS transistor MP1 is increased, and the driving performance of the first PMOS transistor MP1 is degraded. This is due to a body effect, and thus the first bulk bias voltage VB_1 may act as a voltage applied to a back gate.

Accordingly, when the external voltage VDD is increased, operation speed of the first PMOS transistor MP1 is reduced, and thus the period of the oscillation signal OSC is increased.

In contrast, when the external power voltage VDD is reduced, a threshold voltage of the first PMOS transistor MP1 is reduced, thus driving performance of the first PMOS transistor MP1 is improved and the period of the oscillation signal OSC is reduced.

As described above, the charge pump 200 generates a pumping voltage VPP increased according to an increase in the external power voltage VDD. According to an embodiment, when a voltage level of the pumping voltage VPP is increased, the period of the oscillation signal OSC is increased to reduce a pumping rate of the charge pump 200 and thus to reduce a rate of increase in the pumping voltage VPP. Accordingly, a rate of occurrence in noise of the pumping voltage VPP generated when the external power voltage VDD is increased due to unknown factors may be reduced to enable efficient voltage management.

In contrast, when the external power voltage VDD is reduced, the pumping voltage is also reduced. At this time, the period of the oscillation signal OSC is reduced to increase a pumping rate of the charge pump 200.

The oscillator 100 according to an example embodiment of the present invention may apply the external power voltage VDD to the plurality of inverter units 120_1, 120_2, ..., 120_2n as the bulk bias voltage to control the period of the oscillation signal OSC.

For example, when the pumping voltage VPP is increased according to an increase in the external power voltage VDD, an operation of adjusting the period of the oscillation signal OSC by sensing the increased pumping voltage VPP, an operation of reducing the internal power voltage VDDI or compensating the external power voltage according to the pumping voltage VPP, and the like may be performed. However, if a pumping circuit includes a plurality of sensing units and compensating units to perform the operation, the pumping circuit is not suitable for miniaturization.

The pumping circuit 10 according to an embodiment may adaptively enable control of the period of the oscillation signal OSC through a simple configuration which applies the external power voltage to the oscillator 100 as it is.

The RC stabilization part R1 and C1 may operate as a low-pass filter. The RC stabilization part R1 and C1 may be configured to remove a noise component of the oscillation signal OSC which may be generated when the oscillation signal OSC passes through each of the inverter units with a constant delay time.

In embodiments, the bulk bias voltage VB_1, VB_2, ..., VB_2n may be selectively provided to PMOS transistors MP1, MP2, ..., MP2n of the inverter units 120_1, 120_2, ..., 120_2n.

For example, as a corresponding one of the bulk bias voltages VB_1, VB_2, ..., VB_2n is applied to a corresponding one of the inverter units, the oscillation signal OSC may be controlled to have a constant period. When the external power voltage VDD is applied to the inverters 120_1, 120_2, ..., 120_2n in the oscillator 100 as the bulk bias voltages VB_1, VB_2, ..., VB_2n, increases and reduction in the period corresponding to twice an increase and twice a reduction in the period generated by one inverter unit may be generated.

When the period of the oscillation signal OSC is excessively changed as compared to an amount in change of the external power voltage VDD, an operation of changing the bulk bias voltages VB_1, VB_2, ..., VB_2n provided to the inverter units 120_1, 120_2, ..., 120_2n from the external power voltage VDD to the internal power voltage VDD1 may be performed. The voltage provider 300 of FIG. 1 may provide the bulk bias voltages VB_1, VB_2, ..., VB_2n.

Therefore, the voltage provider 300 of FIG. 1 may selectively provide the bulk bias voltages VB_1, VB_2, ..., VB_2n to each of the plurality of inverter units 120_1, 120_2, ..., 120_2n based on changes in the pumping voltage VPP and the oscillation signal OSC in accordance with changes in the external power voltage VDD. The bulk bias voltage VB_1, VB_2, ..., VB_2n, which may be selectively provided by the voltage provider 300, may be one of the internal power voltage VDDI or the external power voltage VDD.

Although not shown, the voltage provider 300 may be connected to each of the plurality of inverter units 120_1, 120_2, ..., 120_2N to provide the bulk bias voltages VB_1, VB_2, ..., VB_2n. For example, to further increase a change in the period of the oscillation signal OSC according to a change of the external power voltage VDD, the external power voltage VDD may be provided to more of the inverter units as the bulk bias voltage, and to further reduce a change in the period of the oscillation signal OSC, the number of inverter units to which the internal power voltage VDDI is provided as the bulk bias voltage is increased.

The pumping circuit according to the example embodiments of the present invention may keep the level of the pumping voltage VPP stable by adaptively controlling the period of the oscillation signal OSC according to a change in the external power voltage VDD.

Further, the pumping circuit according to the example embodiments of the present invention may control the pumping rate to control the change in the pumping voltage and thus easily control noise when the pumping voltage is changed to an undesired level.

The pumping circuit according to the example embodiments of the present invention may stably supply a voltage regardless of change that occurs in an external power voltage.

The pumping circuit according to the example embodiments of the present invention may ensure a time for noise control by controlling pumping driving performance.

The above embodiment of the present invention is illustrative and not limitative. Various alternatives and equivalents are possible. The invention is not limited by the embodiment described herein. Nor is the invention limited to any specific type of semiconductor device. Other additions, subtractions, or modifications are obvious in view of the present disclosure and are intended to fall within the scope of the appended claims.

The invention claimed is:

1. A pumping circuit comprising:
a charge pump configured to generate a pumping voltage based on a first voltage in response to an oscillation signal; and
an oscillator configured to provide the oscillation signal driven by a second voltage which is different from the first voltage,
wherein the oscillator comprises a plurality of inverter units, each of the inverter units includes a PMOS transistor and an NMOS transistor electrically coupled in series, and
the first voltage is provided to a bulk terminal of at least one of PMOS transistors of the inverter units, and
wherein, according to change of the first voltage, a threshold voltage of the at least one of the PMOS transistors is adjusted, and operation speed of the at least one of the PMOS transistors is adjusted, thereby controlling a period of the oscillation signal.

2. The pumping circuit of claim 1, wherein the inverter units sequentially connected in a ring or chain form.

3. The pumping circuit of claim 1, wherein the PMOS transistor and the NMOS transistor included in each of the inverter units are electrically coupled in series between the second voltage and a ground voltage, and a gate terminal of the PMOS transistor is electrically coupled with a gate terminal of the NMOS transistor.

4. The pumping circuit of claim 1, wherein the first voltage corresponds to an external power voltage, and the second voltage corresponds to an internal power voltage.

5. The pumping circuit of claim 1, further comprising a logical operator configured to perform a logical AND operation on the oscillation signal corresponding to an output signal of a last inverter unit among the plurality of inverter units, and an oscillation enable signal,
wherein an output signal of the logical operator is provided as an input signal to a first inverter unit among the plurality of inverter units.

6. The pumping circuit of claim 1, wherein each of the plurality of inverter units further includes a low-pass filter configured to remove noise of the oscillation signal.

7. The pumping circuit of claim 4, further comprising a voltage provider,
wherein the voltage provider selectively provides the first voltage or the second voltage to the bulk terminal of the at least one of the PMOS transistors bias voltage based on the pumping voltage and the oscillation signal.

8. The pumping circuit of claim 1, wherein the period of the oscillation signal is controlled to be proportional to change in the first voltage.

9. The pumping circuit of claim 1, wherein the pumping circuit is configured to generate the pumping voltage with a constant magnitude regardless of changes in the first voltage.

10. The pumping circuit of claim 1, wherein in response to the oscillation signal the charge pump changes a voltage provided to terminals of a capacitor comprising the charge pump.

11. A pumping circuit comprising:
a charge pump configured to generate a pumping voltage based on a first voltage in response to an oscillation signal;
an oscillator configured to provide the oscillation signal driven by a second voltage which is different from the first voltage;
a voltage provider configured to respectively provide the first voltage and second voltage to the charge pump and the oscillator, and provide a bulk bias voltage selected based on the oscillation signal to at least one of a bulk of PMOS transistor included in the oscillator,
wherein the oscillator comprises a plurality of inverter units, each of the plurality of inverter units includes a PMOS transistor and an NMOS transistor,
and the at least one of the bulk PMOS transistor receives the bulk bias voltage, delays the oscillation signal by adjusting a threshold voltage to control a period of the oscillation signal.

12. The pumping circuit of claim 11, wherein the voltage provider selects the bulk bias voltage from the first voltage and the second voltage based on the oscillation signal and the pumping voltage.

* * * * *